United States Patent
Song et al.

(10) Patent No.: US 7,085,245 B2
(45) Date of Patent: Aug. 1, 2006

(54) COEFFICIENT DOMAIN HISTORY STORAGE OF VOICE PROCESSING SYSTEMS

(75) Inventors: Wei-Jei Song, Aliso Viejo, CA (US); Kan Lu, Irvine, CA (US); Mike Tomlinson, Aliso Viejo, CA (US)

(73) Assignee: 3DSP Corporation, Irvine, CA (US)

( * ) Notice: Subject to any disclaimer, the term of this patent is extended or adjusted under 35 U.S.C. 154(b) by 1006 days.

(21) Appl. No.: 10/012,736

(22) Filed: Nov. 5, 2001

(65) Prior Publication Data

US 2003/0086382 A1    May 8, 2003

(51) Int. Cl.
*H04B 3/20* (2006.01)
*H04M 9/08* (2006.01)

(52) U.S. Cl. ................... 370/290; 379/406.08

(58) Field of Classification Search ........... 370/286, 370/290; 375/220, 222, 232, 346, 350; 379/406.01, 379/406.08; 455/570
See application file for complete search history.

(56) References Cited

U.S. PATENT DOCUMENTS

| | | | |
|---|---|---|---|
| 3,787,645 A | 1/1974 | Ochiai | |
| 4,669,116 A | 5/1987 | Agazzi et al. | |
| 5,606,550 A | 2/1997 | Jangi | |
| 5,664,011 A | 9/1997 | Crochiere et al. | |
| 5,664,021 A * | 9/1997 | Chu et al. | 381/92 |
| 5,887,059 A | 3/1999 | Xie et al. | |
| 5,905,717 A | 5/1999 | Hasegawa | |
| 6,738,358 B1 * | 5/2004 | Bist et al. | 370/289 |
| 2003/0016815 A1 * | 1/2003 | Kurtz et al. | 379/406.01 |

* cited by examiner

*Primary Examiner*—Chi Pham
*Assistant Examiner*—Kevin C. Harper
(74) *Attorney, Agent, or Firm*—East IP Group; Philip K. Yu

(57) ABSTRACT

A method and apparatus for canceling a near-end echo of a far-end signal for each channel of a voice over packet multi-channel communications gateway. The invention applies "off-the-shelf" coding mechanisms as well as novel coding schemes to provide fixed compression rate and with options to maintain perfect speech integrity on certain processing components, such as network echo canceller, acoustic echo canceller, Voice Activity Detector, Comfort Noise Generation, etc. The off-the-shelf compression algorithm includes LPC-10, G.723.1, G.729A. The alternatives are Wavelet transform, DPCM, and ADPCM, etc.

4 Claims, 4 Drawing Sheets

COEFFICIENT DOMAIN HISTORY STORAGE OF VOICE PROCESSING SYSTEMS

FIELD OF THE INVENTION

The present invention relates to voice-over-packet ("VOP") communications systems and more particularly to method and apparatus for memory management in such VOP systems.

ART BACKGROUND

The advent of the Internet has dramatically changed how communication is conducted in the world. In addition to enabling worldwide exchange of packets of data, the Internet can also be used to transmit packets of voice signal. Transmitting voice in packets presents a very attractive proposition for telecommunication carriers, since the same network equipment can now provision data and voice communications.

In a voice-over-packet ("VOP") communication system, a gateway apparatus is used to provide conversion between time-division multiplexed ("TDM") signals and packetized data for transmission through an IP/ATM network. Conventionally, a gateway only needs to handle between 4 to 8 channels of transmission per chip. However, as the technology moves to high-density, multiple-channel switches, a VOP gateway is expected to be able to handle well over 500 to 1000 channels per chip. Such increased processing needs necessarily call for more integration and hence the so-called system-on-chip ("SoC") solutions for VOP gateways. The more densely packed the SoC chips are, the more capacity and processing power the gateway can handle. Higher capacity translates to more revenues for the Telco carriers.

VOP processing also demands certain amount of history for speech/voice continuity as in speech coders, or for processing buffers and coefficients as in echo cancellation ("EC") and voice activity detection ("VAD"). Conventionally, EC and VAD get their necessary data from off-core or off-chip external memory for high density system, and then save the data after processing to the external memory. Such uploading and downloading is undesirable in the environment of high-density and multiple channel switches, because of the increase in bus traffic. Making use of on-core memories, on the other hand, forces one to confront the cost of on-core space usage, i.e. the cost of "real estate," since on-core memory devices are generally limited in size. Additionally, use of on-core memory invariably requires processing power to perform memory compression to optimize the limited memory capacity. As such, many VOP gateway designs have been forced to juggle between providing on-core storage, and taking a hit by shuffling channel-associated data in and out of the external memory or on-chip off-core memory. For low channel density systems, e.g. 2 or 4 channels, processing power for memory management may not be as significant. However, for high channel density systems, process power becomes critically important.

It should be pointed out that by "on-core," it commonly refers to a memory or buffer that is provided with a digital signal processor ("DSP") core, thus making the on-core memory dedicated to the DSP core. "Off-core" is generally understood to be a memory or buffer that may serve multiple DSP cores but nevertheless is still on the same integrated circuit as the multiple DSP cores. "Off-chip" means the memory is not provided on the same integrated circuit as the DSP cores. An "off-chip" memory is generally not as limited in size as the on-core or off-core kind. Instead, it is shared by many DSP cores and possibly on different integrated circuits.

Conventional memory compression schemes, such as Microsoft® DOS® Operating System 6.2 with embedded Stacker technology, generate compression ratios that are data dependent. Without a fixed ratio for compression, the system performance can be quite unpredictable.

Therefore, it is desirable to compress data for storage, without compromising quality, for voice-over-packet applications.

It is also desirable to compress data without sacrificing unnecessary processing power for voice-over-packet applications.

SUMMARY OF THE INVENTION

A method and apparatus for efficient use of processing power for memory management in high channel density, voice-over-packet gateway is discloses. By allocating processing power for memory compression of coefficient domain history, data traffic is reduced while preserving processing integrity. Also, processing power can further be reduced, when coefficient domain history is unchanged and is not written back.

More specifically, a method of canceling a near-end echo of a far-end signal for each channel of a voice over packet multi-channel communications gateway is disclosed. The method comprises: providing compressed $1^{st}$ references in a reference buffer; for a current frame, loading $1^{st}$ coefficients from a coefficient buffer and said compressed $1^{st}$ references from said reference buffer for processing; decompressing said compressed $1^{st}$ references and said $1^{st}$ coefficients; generating decompressed $1^{st}$ references and decompressed $1^{st}$ coefficients; canceling said near-end echo using said decompressed $1^{st}$ references and said decompressed $1^{st}$ coefficients; generating $2^{nd}$ references and $2^{nd}$ coefficients; compressing at least a portion of said $2^{nd}$ references; if said $2^{nd}$ coefficients are different from said $1^{st}$ coefficients, compressing said $2^{nd}$ coefficients; storing one of said $1^{st}$ coefficients and said compressed $2^{nd}$ coefficients to said coefficient buffer; and said compressed $2^{nd}$ references to said reference buffer.

DETAILED DESCRIPTION OF THE PREFERRED EMBODIMENTS

A method and apparatus for memory management of voice processing in a voice-over-packet communication gateway is provided. In the following detailed description, numerous specific details are set forth to provide a full understanding of the present invention. It will be obvious, however, to one ordinarily skilled in the art that the present invention may be practiced without some of these specific details. In other instances, well-known structures and techniques, e.g. echo cancellation, voice-activity detection, or data compression schemes, have not been shown in detail so as to avoid unnecessarily obscuring the present invention.

The present invention provides an efficient methodology to utilize the processing power of a digital signal processor in a high channel-density VOP gateway. While compression coding of voice references demands certain processing power, such trade-off is well worth the cost since compression allows data traffic to- and from-memory buffers to be reduced, while preserving the voice integrity after processing. More particularly, after each processing of a voice frame, whether it is echo cancellation or voice-activity detection, the resultant reference memory and coefficients are compressed before they are stored to their buffers. When the next frame of voice is ready for processing, the compressed reference memory and coefficients are loaded for processing. After processing of the next frame, only the newest resultant reference memory is compressed. The compressed reference memory is then stored back to its buffer. Moreover, the coefficients are compressed and written-back only if they are different from the coefficients already stored in the buffer.

Figure 1:
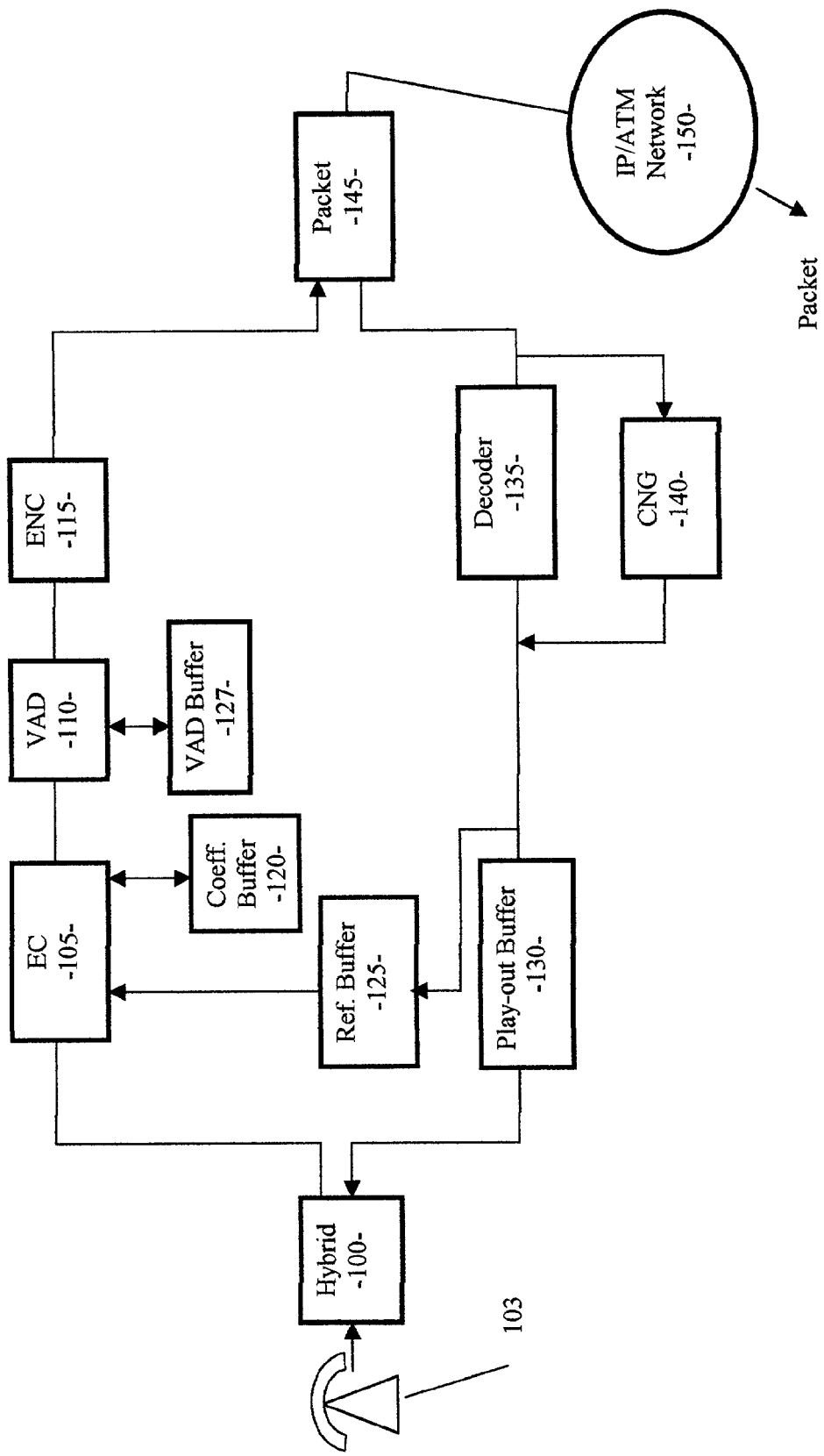
FIG. 1 illustrates an exemplary schematic diagram of a conventional gateway for VOP communications networks.

Reference is to FIG. 1, where an exemplary simplified block diagram of a typical VOP communications gateway is illustrated. A user speaks into a telephone handset 103, which can be either a stand-alone telephone set through a central office switch, or through a private branch exchange ("PBX"). In either arrangement, the call is passed through hybrid 100, which is a device that performs conversion between a 4-wire trunk circuit and a 2-wire subscriber circuit.

From a hybrid 100, the signal ("near-end" signal) is passed through echo canceller 105 to remove the echo caused by the reflection of the far-end signal upon the hybrid 100. A voice activity detection circuit ("VAD") 110 is used to compress the pauses or inactivity in the speech. A voice coder 115 further compresses the speech signals according to established international telecommunications standards such as ITU G.711, G.723.1, G.726, G.728, G.729A/B. The encoded speech signals can now be packetized (145) for transmission through an IP/ATM network 150, instead of the conventional circuit-switched telephone networks.

In the other direction, packetized speech signals are transmitted through the IP/ATM network 150 to be de-packetized (145), decoded (135) with comfort noise generated and inserted (140) and then played out (130). However, due to mismatch of impedance at the hybrid 100, the far-end signals are not completely passed through hybrid 100 and are reflected toward the near-end talker as an echo.

Figure 2:
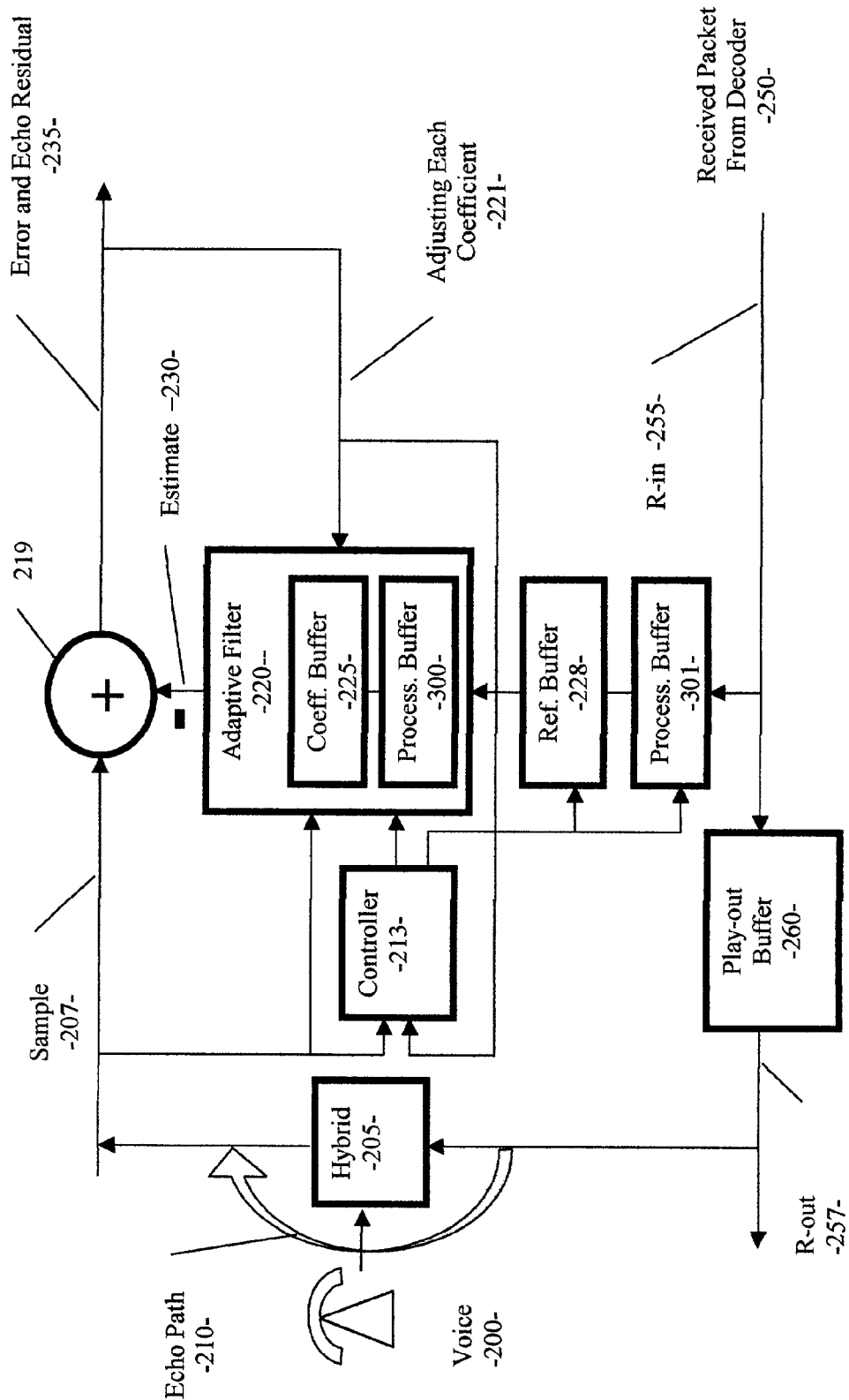
FIG. 2 illustrates an exemplary schematic diagram of one embodiment of an echo canceller in accordance with the present invention.

Conventional echo cancellers have long been deployed to control line echoes in communications network. Referring to FIG. 2, where echo canceller 105, 120, 125 is further explained, an echo canceller includes an adaptive filter 220 and a subtractor 219. Echo cancellers are typically implemented as software algorithms running on digital signal processors. Processing buffers 300, 301, which interface directly among on-chip, off-core and external memory units, are used by echo canceller to compress and decompress data. Buffer 300 connects bi-directionally to coefficient buffer 225 and buffer 301 connects bi-directionally to reference buffer 228. With the help from processing buffer 301, reference buffer 228 concatenates current play-out output with the off-core reference memory to make the total reference buffer the echo canceller needed for processing.

The adaptive filter 220 attempts to model the echo path 210 by applying the incoming signal 207 (containing the echo) to generate an estimated replica signal 230. The replica signal 230 and the incoming signal 207 are applied to the subtractor 219. The subtractor 219 subtracts the replica signal 230 from the incoming signal 207 to produce an error signal 235. The error signal 235 is fed back to the adaptive filter 220 to adjust its filter coefficients (or taps) in order to minimize the error signal 235. In this manner, the filter coefficients will converge toward values that optimize the replica signal 230 in order to cancel, or at least partially offset, the echo component in the incoming signal 207. As is well-understood by those skilled in the art, echo cancellers offer the advantage of not disrupting the signal path, especially in situations of double-talk, i.e. when speakers at both ends are talking simultaneously.

U.S. Pat. No. 5,905,717 (issued to Hasegawa), U.S. Pat. No. 5,887,059 (issued to Xie at al.), U.S. Pat. No. 5,664,011 (issued to Crochiere et al.), U.S. Pat. No. 5,606,550 (issued to Jangi), U.S. Pat. No. 4,669,116 (issued to Aggazi), and U.S. Pat. No. 3,787,645 (issued to Ochiai et al.) provide background discussions on echo cancellers, the disclosures of which are all incorporated herein by reference.

Figure 3:
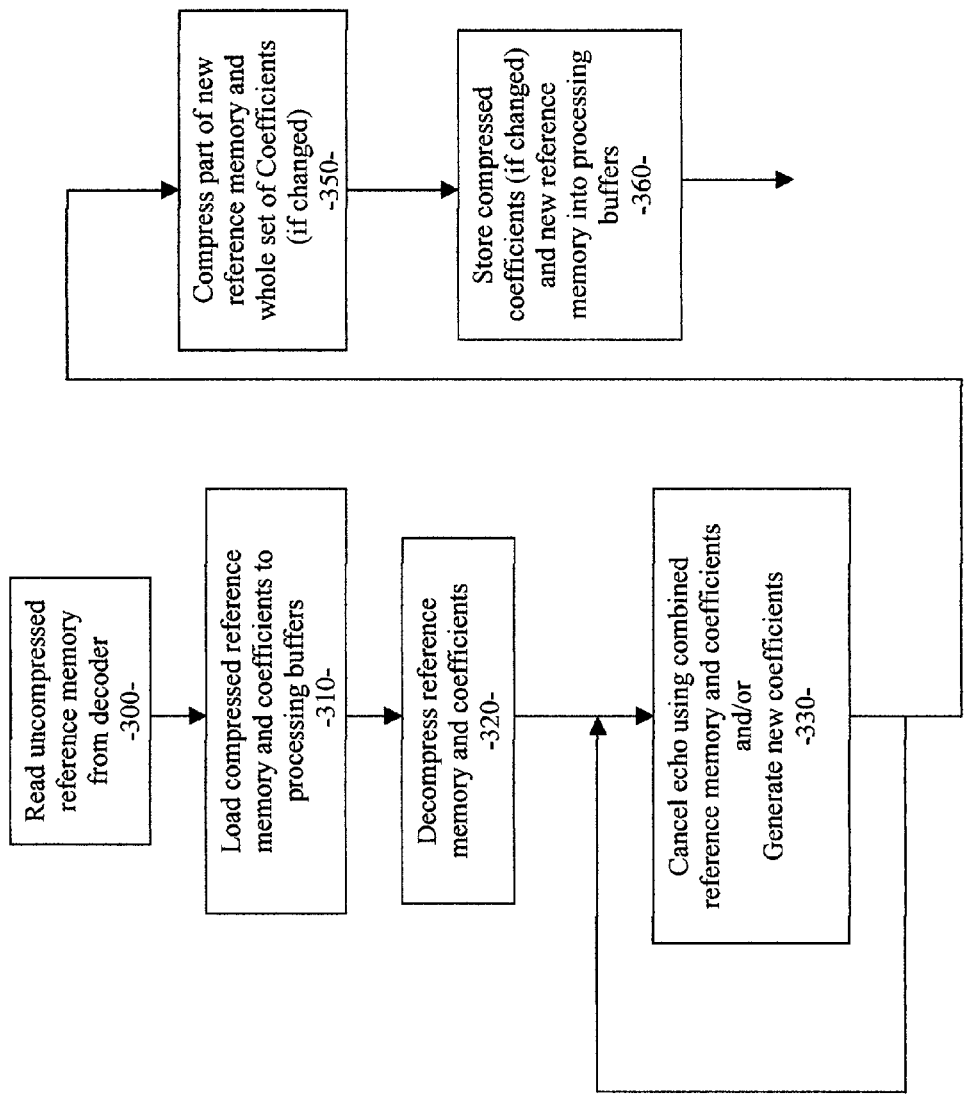
FIG. 3 illustrates an exemplary flow chart of another embodiment of the present invention.

FIG. 3 is a flow chart illustrating one embodiment in accordance with the present invention. For each frame of a speech sample applied to the echo canceller, the controller 213 causes the new references and near-end coefficients to be read (step 300). At step 310, the previously compressed references and coefficients are loaded by controller 213 to their respective processing buffers, which interface to off-core memory. At step 320, the references and coefficients are de-compressed. The adaptive filter then uses the combined, now-decompressed references and coefficients to perform echo cancellation of the near-end echo using echo cancellation routines, such as Least-Mean Square, while generating new coefficients. Upon finishing processing of one frame of incoming signal, a portion of the new references and the complete set of coefficients are compressed.

It should be pointed out that only the newest portion of the references, i.e. the newest 10 ms, in the reference buffer needs to be compressed, because the buffer still contains the rest of the references, i.e. the other 118 ms, previously compressed. As the newest portion is received from the decoder and compressed, the oldest portion in the reference buffer is discarded. Instead of having to compress the whole reference buffer, typically 128 ms, the compression is only applied to 10 ms, which represents a significant saving in compression resources.

Also, if the coefficients have not been changed, then no compression is applied to the coefficients so as to conserve processing power. The compressed coefficients and the compressed newest portion of the references are then stored back into their respective buffers.

Figure 4:
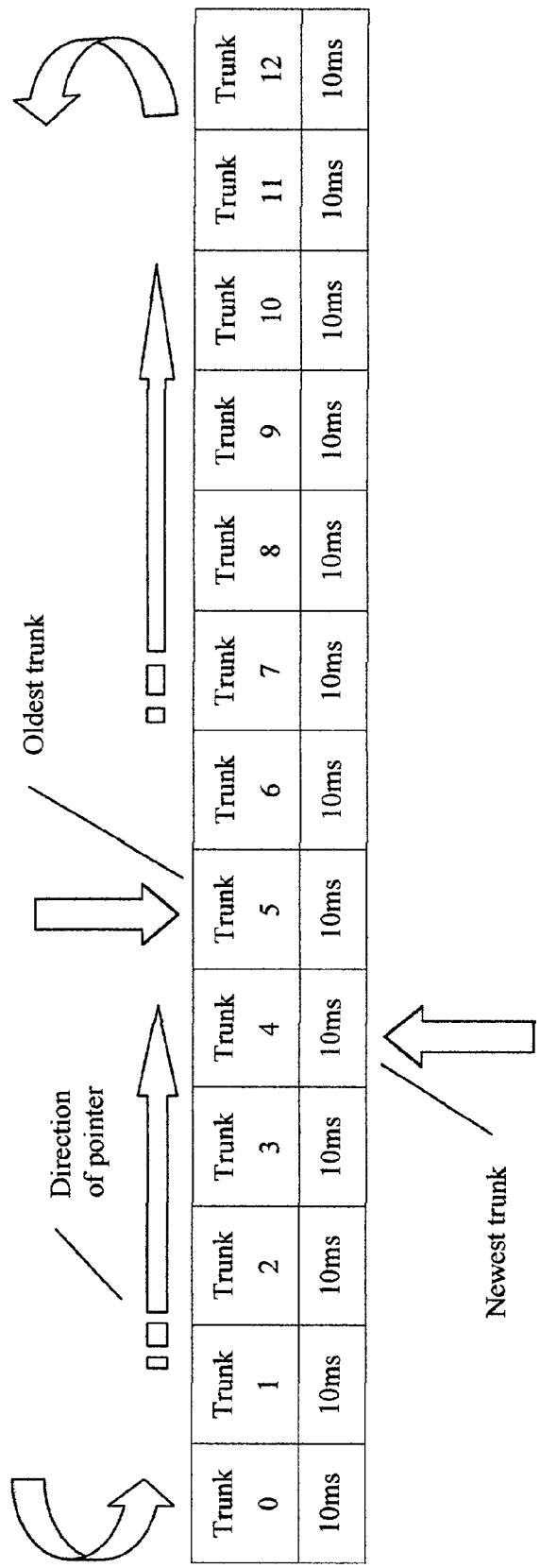
FIG. 4 illustrates an exemplary diagram of a circular buffer for storing reference memory.

Additional savings may be realized by using a 130 ms, instead of the typical 128 ms, circular buffer divided into 13 trunks of 10 ms each, as shown in FIG. 4. As a new trunk is received, the oldest trunk (e.g. Trunk No. 5) is discarded. The new trunk will thus take the position of the discarded trunk in NO. 5, which will now be pointed as the newest truck. At the same time, Trunk No. 6 becomes the oldest trunk as the pointer moves on. Such replacement of trunk-sized data can be achieved seamlessly because the boundary is fixed, due to the equal trunk size. Of course, those skilled in the art can readily determine the most suitable trunk size and buffer size for their application to take advantage of the invention.

As can be appreciated by those skilled in the art, many "off-the-shelf" fixed-ratio compression algorithms have been developed, e.g. LPC-10, G.723.1, G.729A, Wavelet transform, DPCM and ADPCM, which can be used for compression without degrading the quality of echo cancellation. Further, compressing the references and coefficients does not interfere with the play-out buffer 260, thus not affecting the play-out quality.

In contrast, in the conventional methodology, neither reference memory nor the coefficients are compressed. Rather, because of the memory limitations, the references and the coefficients are typically stored in an external memory, either off-core or off-chip, and accessed on an as-needed basis. Such loading and unloading compromises the speed and performance of the echo canceller. In accordance with the present invention, although off-core memory might still be needed due to high channel density demand of huge chunk of channel-specific storage, the traffic will be greatly curtailed along with the significant saving in the size of off-core memory, whether it is on-chip or off-chip.

As can be appreciated by those skilled in the art, the voice processing system in accordance with the present invention can also be applicable to voice processing associated with a voice activity detector. VADs, like echo cancellers, make use of historic parameters, such as level, linear-prediction coding ("LPC") and peak/average, to achieve speech/voice continuity. A conventional VAD generally requires storage of 240 samples, which are typically buffered for VAD only. As such, the storage or use of buffers can similarly benefit from "off-the-shelf" compression schemes in accordance with the present invention. While compression and decompression also involve a demand on processing power, such demand turns out to represent a suitable trade-off for performance gained as a result of having on-core memory access, having less traffic in shuffling data and needing smaller off-core memory.

The present invention may be embodied in other specific forms without departing from the spirit or essential characteristics thereof. The present embodiments are to be considered in all respects as illustrative, and not restrictive. The scope of the invention is therefore, indicated by the appended claims rather than by the foregoing description, and all changes which come within the meaning and range of equivalency of the claims are to be embraced within their scope.

We claim:

1. An echo canceller comprising:
 a) a receive path having an input port and an output port;
 b) a send path having an input port and an output port;
 c) an adaptive filter with an input port coupled to said receive path, said adaptive filter generating an estimate of an echo based on first coefficients and first references, said adaptive filter further adaptively modifying said first coefficients in response to a receive input signal and a difference between said estimate and said echo;
 d) a subtractor with an addend input port coupled to said send input port, a subtractend input port coupled to an output port of said adaptive filter, and an output port coupled to a feedback input port of said adaptive filter;
 e) a reference memory buffer coupled to said send path and said adaptive filter for storing first references;
 f) a coefficient buffer coupled to said adaptive filter and said send path for storing first coefficients;
 g) a controller coupled to said adaptive filter, said controller:
  i) loading said first references and said first coefficients;
  ii) decompressing said first references and said first coefficients for use in echo cancellation by said adaptive filter;
  iii) receiving new references and new coefficients after echo cancellation;
  iv) compressing at least a portion of said new references and storing to said reference memory buffer;
  v) compressing said new coefficients, if said new coefficients are different from said first coefficients;
  vi) storing one of said new coefficients and said first coefficients to said coefficient buffer.

2. The echo canceller of claim 1, wherein said controller compresses said coefficients and references based on a fixed compression rate.

3. The echo canceller of claim 2, wherein said fixed compression rate comprises one of the following compression algorithms:
 h) LPC-10;
 i) G.723.1;
 j) G.729A;
 k) Wavelet transform;
 l) DPCM;
 m) ADPCM.

4. The echo canceller of claim 1, wherein said reference memory buffer comprises a plurality of equal-sized trunks with said controller replacing a least recent trunk with a most recent trunk after compressing said most recent trunk.

* * * * *